United States Patent [19]

Duran et al.

[11] 4,269,968
[45] May 26, 1981

[54] SYNTHESIS OF POLYAMIC ACID

[75] Inventors: John Duran; Leo Missel, both of San Jose; Thomas O. Montelbano, Palo Alto, all of Calif.

[73] Assignee: International Business Machines Corporation, Armonk, N.Y.

[21] Appl. No.: 93,779

[22] Filed: Nov. 13, 1979

[51] Int. Cl.³ .................................................. C08G 73/10
[52] U.S. Cl. .................................... 528/351; 528/125; 528/126; 528/179; 528/188; 528/223; 528/229; 528/353
[58] Field of Search ............... 528/125, 126, 179, 188, 528/223, 229, 351, 353

[56] References Cited

U.S. PATENT DOCUMENTS

| 3,766,117 | 10/1973 | McQuade | 260/29.2 N |
|---|---|---|---|
| 3,778,411 | 12/1973 | Emerick et al. | 260/229 |
| 3,835,207 | 9/1974 | Frost et al. | 264/41 |
| 3,996,203 | 12/1976 | Hand et al. | 528/353 |
| 4,017,886 | 4/1977 | Tomono et al. | 357/54 |

OTHER PUBLICATIONS

Duran et al., *IBM Technical Disclosure Bulletin,* vol. 19, No. 12, p. 4741, May 1977.

Primary Examiner—Lester L. Lee
Attorney, Agent, or Firm—Joseph G. Walsh

[57] ABSTRACT

Polyamic acid having greatly increased adhesive ability is prepared by compacting a solid aromatic dianhydride to reduce its surface area to weight ratio and reacting the compacted dianhydride with a solution of an organic diamine in an inert non-aqueous solvent.

5 Claims, No Drawings

SYNTHESIS OF POLYAMIC ACID

DESCRIPTION

1. Technical Field

The present invention is concerned with a process for the manufacture of polyamic acid. In particular, it is concerned with a process whereby there is obtained polyamic acid having greatly improved ability of adhere to other materials, including, for example, gold, other metals and alloys, and bubble chips.

2. Background Art

The synthesis of polyamic acid is described in the literature in numerous places. See, for example, U.S. Pat. Nos. 3,766,117; 3,778,411; 3,835,207; 3,996,203; and 4,017,886. As may be seen from inspection of the prior art, polyamic acid is prepared by reacting an organic diamine with an aromatic dianhydride. As far as we are aware, however, no prior art describes the unique method of reaction which is the subject of the present invention.

The publication in the IBM Technical Disclosure Bulletin by Duran et al, Vol. 19 No. 12, p. 4741, May 1977, describes the purification of the starting materials to prepare polyamic acid. The publication however, contains no teaching in regard to the reaction between the starting materials.

In the prior art, the most common method for synthesizing polyamic acid involves a reaction between an organic diamine and an aromatic dianhydride in which the aromatic dianhydride is in the form of a powder or small crystalline particles. It is by changing the condition of the aromatic dianhydride during the reaction that the unexpected advantages of the present invention are obtained.

DISCLOSURE OF THE INVENTION

According to the present invention, polyamic acid having very greatly improved ability to adhere to other materials is synthesized by first compacting the solid aromatic dianhydride starting materials to reduce its surface area to weight ratio. An organic diamine is dissolved in an inert nonaqueous solvent and the dianhydride in compacted form is reacted with the solution of the diamine. When this procedure is followed, there is obtained polyamic acid which has totally unexpected ability to adhere to other materials, including gold, other metals and alloys, and bubble chips.

As mentioned previously, in the prior art synthesis of polyamic acid, the aromatic dianhydride was present during reaction in the form of a powder or flakes of crystals. According to the present invention, the aromatic dianhydride is compacted prior to reaction. The word "compacted" is used in its ordinary meaning, that is, to describe a process in which the surface area of the material is reduced so that the surface area to weight ratio is reduced.

Compacting may be accomplished by any desired method. The most convenient is to melt the dianhydride and allow it to solidify in the form of a single solid piece. Alternatively, smaller particles may be compacted together by the application of pressure.

For best results, the starting materials should be highly purified. Purification procedures have been described in the prior art. In particular, the above-mentioned IBM Technical Disclosure Bulletin describes the purification of the starting materials. A preferred method of purification is by zone refining. When zone refining has been carried out on the aromatic dianhydride, it is possible, by breaking the glass container and removing the material in the form of a solid ingot, to obtain the dianhydride in a compacted form suitable for use in the present invention.

The present invention is suitable for use with any of the materials known in the prior art for making polyamic acid. For example, U.S. Pat. No. 3,766,117, mentioned above, lists useful organic diamines and also useful aromatic dianhydrides. The preferred dianhydrides are pyromellitic dianhydride (PMDA) and also benzophenonetetracarboxylic dianhydride (BTDA). The most preferred diamines are diamino diphenylether (DADPE), and tetramethylbenzidine (TMB). The solvent for the reaction is a material which does not contain functional groups which react with either the diamine or the dianhydride to any appreciable extent. Many such solvents are known to the prior art and are discussed in the above-listed U.S. Pat. No. 3,766,117. For the purposes of the present reaction, the most preferred solvent is dimethylsulfoxide (DMSO).

The reaction is preferably carried out in an inert atmosphere, for example, under nitrogen gas. It is also preferable that during the reaction care be taken to maintain the temperature below 28° Centigrade.

When the polyamic acid is prepared according to the process of the present invention, the material has properties which are greatly improved over the materials of the prior art. Because of its adhesive properties, it can adhere directly to gold, thereby avoiding the need to use a refractory metal adhesion layer. In this manner, failure due to stress is avoided. In like manner, the polyamic acid of the present invention may successfully be used to passivate bubble chips. Such passivation is usually accomplished by first treating the substrate with, for example, carbontetrafluoride hot vapors for one minute to clean the substrate. The polyamic acid may then be applied to the substrate and spun, for example, on a wafer. The usual procedure is spinning at 2500 revolutions per minute for about 30 seconds. Following the spinning, the coating is pre-cured by heating in air for about 30 minutes at a temperature of about 50° Centigrade, and then heated for an additional 30 minutes at about 120° Centigrade.

When the polyamic acid of the present invention is used to passivate bubble chips, very great and totally unexpected advantages are obtained. Blistering, peeling and glass holes are eliminated, as is high stress. Corrosion protection is improved. Edge covering and planarization are improved. The resulting material has excellent dielectric properties. Water transmission is insignificant. The adhesion obtained is of an order previously unobtainable.

The applicants do not wish to be bound by any theoretic explanation of their invention. It is, however, their belief that when the aromatic dianhydride is in compacted form during the reaction, the resulting polyamic acid has a much higher molecular weight than in the prior art, where the aromatic dianhydride is in the form of a powder. Compacting the dianhydride prior to the reaction results in a decrease in the surface area to weight ratio, and makes fewer sites available for reaction. With the compacted dianhydride, there is no exothermal surge, with the temperature never rising above 28° Centigrade. These conditions lead to an increase in chain length, and in molecular weight. This theory is consistent with the observation that it is most preferred that the aromatic dianhydride be present as one large solid mass, for example in the form of a solid ingot. Good results have been obtained when the solid ingot of the aromatic dianhydride has been as small as a cylinder 11 millimeters in circumference, and 12 millimeters in height.

The following Example is given solely for purposes of illustration and is not to be considered a limitation on the invention, many variations of which are possible without departing from the spirit or scope thereof.

PREFERRED EMBODIMENT

The starting materials are first purified. Oxydianiline is initially purified by high vacuum sublimation. The sample powder is then placed into a long glass tube (11–12 mm outside diameter) where it is degassed and solidified under vacuum and partial $N_2$ atmosphere. The tube is then sealed under 500 mm $N_2 \uparrow$ and further purified by zone refining, where remaining impurities are moved to the lower end of the tube.

Pyromellitic dianhydride (PMDA) is first recrystallized from methyl-ethyl-ketone. The crystals are then mortar crushed and vacuum pumped to remove most of the ketone. The PMDA powder is then vacuum sublimed to remove residual traces of solvent and to deacidify trace amounts of pyromellitic acid. The sublimed PMDA powder is then further purified through zone refining by the procedure used for ODA.

Following the completion of zone refining of PMDA, the tube is cut into ~4" sections, and the PMDA solid ingots are easily pushed free of the glass section. ODA, however, tends to stick to the glass tube and must be crushed (along with the glass) and separated by high vacuum sublimation.

The polar-type solvents used usually require no further purification other than vendor distillation (in glass).

The precursors PMDA and ODA are separately weighed to obtain 1:1 stoichiometric amounts of each.

The powdered ODA is then placed into a flask containing a measured amount of solvent (dimethysulfoxide and stirred to complete dissolution. Hydrolysis is minimized by continuous purge with dry nitrogen gas or by using a closed-vessel setup. After the ODA has completely dissolved, the PMDA ingots are added (may be added all at once) to the diamine solution and stirred continuously for 18 hours. Upon complete dissolution of the PMDA, the polyamic acid solution is stored in sealed bottles at room temperature for 12–14 days without opening. Following this "aging" period, the polyamic acid need not be refrigerated to remain stable. Furthermore, the material prepared by the present invention never forms a gel.

We claim:

1. A process for preparing polyamic acid which has improved adhesion properties, said process comprising the steps of:
   (1) compacting a solid aromatic dianhydride to reduce its surface area to weight ratio,
   (2) forming a solution by dissolving an aromatic diamine in an inert non-aqueous solvent, and
   (3) reacting the aromatic dianhydride in solid compacted form with the solution of the organic diamine.

2. A process as claimed in claim 1 wherein the compacting comprises melting and resolidifying the aromatic dianhydride.

3. A process as claimed in claim 1 wherein the compacting comprises applying pressure to the aromatic dianhydride.

4. The process as claimed in claim 1 wherein the aromatic dianhydride is compacted to form a solid ingot.

5. A process as claimed in claim 1 wherein the reaction is carried out in dimethylsulfoxide solvent in an inert atmosphere and at a temperature maintained below 28° C.